July 17, 1951 B. M. OLIVER 2,560,815

TELEVISION RECEIVER BLANKING CIRCUIT

Filed June 30, 1949 3 Sheets-Sheet 1

INVENTOR
B. M. OLIVER
BY Hugh S. Wertz
ATTORNEY

July 17, 1951 B. M. OLIVER 2,560,815

TELEVISION RECEIVER BLANKING CIRCUIT

Filed June 30, 1949 3 Sheets-Sheet 2

INVENTOR
B. M. OLIVER
BY Hugh S. Wertz
ATTORNEY

July 17, 1951 B. M. OLIVER 2,560,815

TELEVISION RECEIVER BLANKING CIRCUIT

Filed June 30, 1949 3 Sheets-Sheet 3

INVENTOR
B. M. OLIVER
BY Hugh S. Wertz
ATTORNEY

Patented July 17, 1951

2,560,815

UNITED STATES PATENT OFFICE 2,560,815

TELEVISION RECEIVER BLANKING CIRCUIT

Bernard M. Oliver, Morristown, N. J., assignor to Bell Telephone Laboratories, Incorporated, New York, N. Y., a corporation of New York Application June 30, 1949, Serial No. 102,297

5 Claims. (Cl. 315—20)

This invention relates to television and more specifically to the blanking of the scanning beam of a television receiver viewing tube.

It is an object of this invention to cut off the beam current in a television receiver tube during the return trace interval more completely than it has hitherto been accomplished.

It is another object of this invention to perform this beam cut-off operation without any increase in expenditure of transmitter power for the generation of blanking pulses.

It is a further object of this invention to perform this beam cut-off operation without providing additional circuits for generating a local blanking pulse at the television receiver.

At present a complete television signal, such as the standard R. M. A. signal, for example, includes both horizontal and vertical blanking pulses which are used at the receiver station to cut off the receiver tube scanning beam during both horizontal and vertical return traces. Television viewing tubes commonly have a beam current versus grid voltage characteristic which has a remote "cut-off." When the tube bias is set so that proper contrast is obtained, an appreciable beam current flows during the normal blanking period, when the beam in the tube should be cut off. This current causes the return traces on the viewing tube screen to be visible. Because of the increase in transmitter power that would entail, it does not appear feasible to increase the amount of "set up," that is, the height of the pedestal pulse upon which the blanking pulse is located, in the standard picture signal to ensure that the return sweep line will be invisible.

The above and related objects are attained in accordance with an exemplary embodiment of the invention by providing a small tertiary transformer winding on each of the cores of the vertical and horizontal sweep output transformers, these tertiary windings being connected in series between the cathode of the viewing tube and a point of fixed potential, the series circuit also including a diode. During the flyback of either sweep wave, a positive pulse is applied to the plate of the diode which then conducts and raises the cathode potential of the cathode-ray tube, thus blanking out the beam during the sweep return times.

In a modified form of the invention, separate diodes are used, on coupled to each of the sweep circuits.

The invention will be more readily understood by referring to the following description taken in connection with the accompanying drawings forming a part thereof, in which.

While the invention is primarily concerned with a novel blanking circuit in television receivers, a brief description of a complete television receiver circuit will be given to aid in understanding the operation of this invention.

Figure 1:
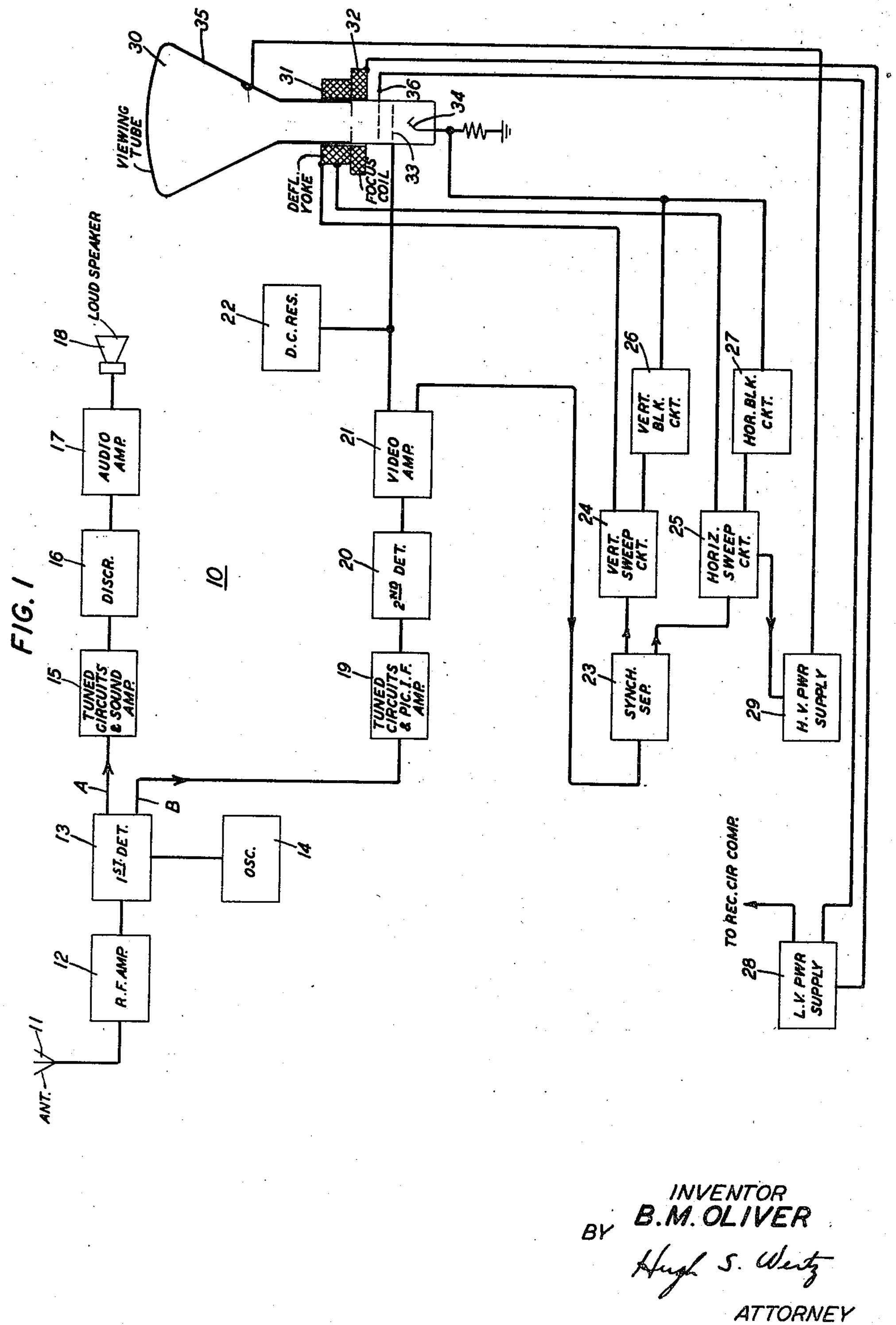
Fig. 1 is a block schematic diagram of a complete television receiver embodying a blanking circuit in accordance with the invention.

Referring more specifically to the drawings, Fig. 1 shows, by way of example for purposes of illustration, a block diagram of a complete television receiver system 10. The incoming television signal from the transmitting station is intercepted by the antenna 11, of any suitable form, and applied to the radio frequency amplifier 12 where it is amplified to the desired level and conducted to the first detector 13. There it is demodulated, in a manner well known, down to the desired intermediate frequency of the system with the aid of the oscillator 14. Intermediate frequency signals are then applied by means of paths A and B to the sound and picture channels, respectively, of the receiver. The sound channel includes an amplifier 15, in the input circuit of which is a tuned circuit. This combination passes the sound intermediate frequency only and amplifies it. The sound signals (which are frequency modulated), after being suitably amplified in amplifier 15, are applied to the discriminator 16 which transforms the frequency-modulated sound intermediate frequency signals to amplitude-modulated audio frequency signals. The output of the discriminator 16 is then amplified by the audio amplifier 17 and applied to loudspeaker 18.

The signals in path B are applied to the picture intermediate frequency amplifier 19, which has in its input circuit suitable tuned circuits passing only the modulated television picture carrier. After suitable amplification by the amplifier 19, the amplified signals are applied to the input of the second detector 20 where they are demodulated down to video frequencies and applied to the video amplifier 21. The output of the video amplifier 21 is applied to the modulating element 33 of the viewing tube 30, the customary direct-current restoring circuit 22 being also connected in this circuit. The circuit 22 reinserts the direct-current level in the signal coming from the video amplifier 21 before it is applied to the control grid 33 of the viewing tube 30.

The output of the video amplifier 21 is also applied to the synchronizing separator 23 which strips off the video portion of the composite signal. The output of the synchronizing separator 23 contains the vertical and horizontal synchronizing pulses only. A low-pass filter or integrating circuit in the output of the synchronizing separator 23 allows only the vertical synchronizing pulses to pass through and affect the vertical sweep circuit 24 while a differentiating circuit in the output of the synchronizing separator 23 permits only horizontal synchronizing pulses to be applied to and affect the horizontal sweep circuit 25. Each sweep circuit applies a saw-tooth current wave to the deflecting coils.

Connected to the vertical and horizontal sweep circuits 24 and 25, respectively, are the vertical and horizontal blanking circuits 26 and 27. These blanking circuits make use of the large voltage pulses which occur during the return times of the sweep waves and the outputs of these circuits are positive pulses which are fed to the cathode 34 of the viewing tube 30 to cut off the beam during all return traces. The amplitudes of these positive pulses are so controlled, in accordance with this invention, that they completely cut off the viewing tube beam during all retrace periods. The pulses occurring during the horizontal return traces are stepped up, rectified and filtered in the high voltage power supply 29, which furnishes the high voltage required for the final anode 35 in the viewing tube 30. The low voltage power supply 28 furnishes power to the various circuit components, to the accelerating grid 36 in the viewing tube 30 and to the magnetic focusing coil 32 thereof. The beam in the tube 30 is formed and controlled in a well-known manner.

Figure 2:
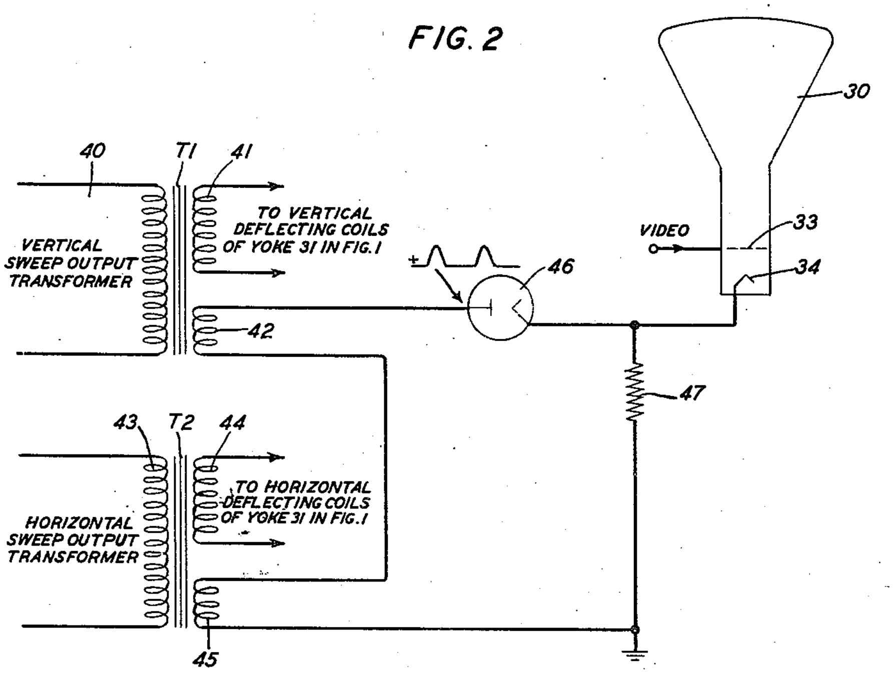
Fig. 2 is a circuit diagram of a television receiver blanking circuit in accordance with the present invention.

Reference will now be made to Fig. 2, which shows in circuit form the vertical and horizontal blanking circuits 26 and 27 (shown in blocks in the diagram of Fig. 1) together with their associated circuit connections to other elements of the circuit of Fig. 1. The vertical sweep circuit 24 terminates in the primary winding 40 of an output transformer T1 having a secondary winding 41 and a tertiary winding 42, while the horizontal sweep circuit 25 terminates in a primary winding 43 of an output transformer which has a secondary winding 44 and a tertiary winding 45. In accordance with well known practice, the secondary windings 41 and 44 of these output transformers are connected to the vertical and horizontal deflecting windings, respectively, of the deflecting yoke 31. In accordance with the present invention, the tertiary windings 42 and 45 are utilized for beam blanking purposes. These two windings are connected in a series circuit including a diode 46 and a series resistor 47, one terminal of the resistor 47 being connected to the cathode 34 of the picture tube 30 and the other end thereof being grounded. During the retrace period of sweep circuits of types well known in the prior art (and which have been represented for that reason merely by blocks 24 and 25), voltage pulses appear across the main secondary windings 41 and 44, respectively. The windings 42 and 45 are so poled that corresponding positive pulses are induced across their terminals and these positive pulses are applied to the plate of the diode 46, resulting in this plate being momentarily at a higher potential than the cathode. Thus the diode presents a low series impedance during this interval and practically the whole pulse is obtained across the resistor 47. The coupling and turns ratio of the tertiary windings 42 and 45 of the transformers T1 and T2, respectively, are so proportioned to the secondary windings 41 and 44 thereof that the pulses obtained across the resistor 47 are sufficient to cut off completely the beam current in the viewing tube 30 during the retrace period which is at the end of every line scan in the case of the pulses produced in the winding 43 and at the end of every field scan in the case of those produced in the winding 40.

Figure 3:
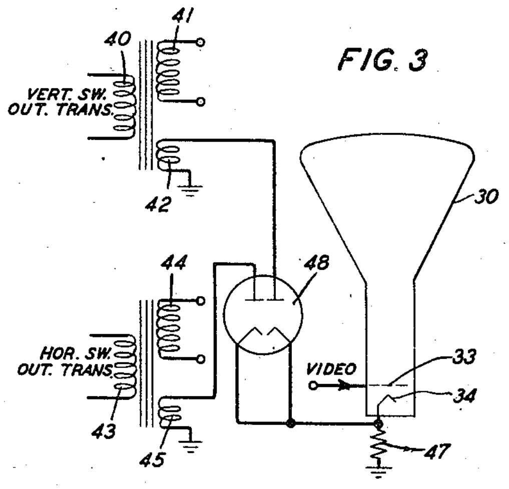
Fig. 3 is a schematic circuit diagram illustrating another form of this invention.
Figures 4, 5:
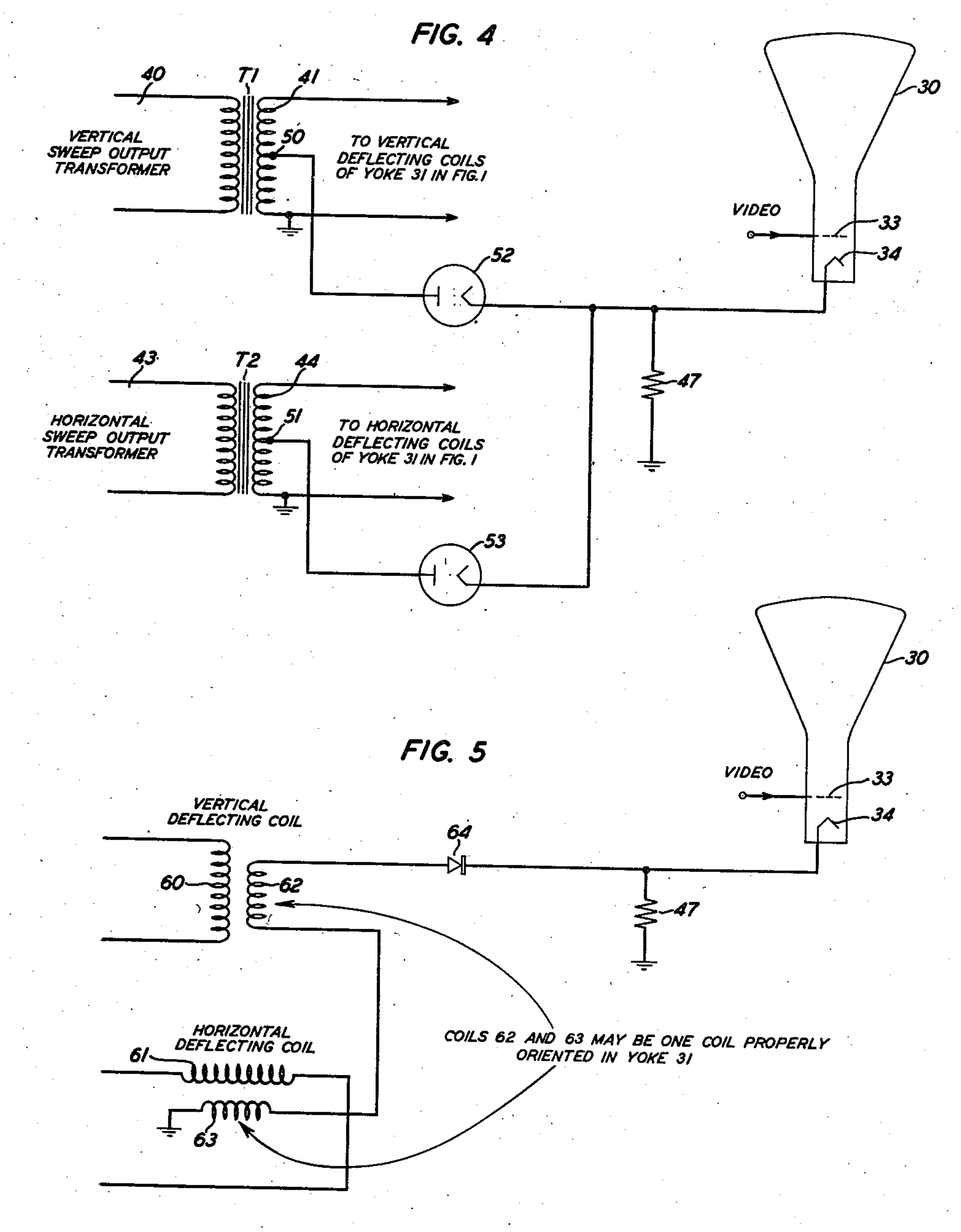
Figs. 4 and 5 show further modifications of the invention.

Alternative forms of the invention are shown in Figs. 3, 4 and 5. In these figures all elements which are similar to corresponding elements in Fig. 2 have been given the same reference characters.

The only difference between the arrangement of Fig. 3 and that of Fig. 2 is that the single diode 46 is replaced by a double diode 48 and that each half of the diode 48 is connected in circuit with one of the windings 42, 45. This arrangement may be slightly more preferable in the situation where cross-talk and frequency response considerations are important since, in the arrangement of Fig. 3, the tertiary windings 42 and 45 are independent of one another, that is, neither is loaded with the stray capacity and series inductance of the other.

In the arrangement of Fig. 4, tertiary windings are not used. Instead, taps 50 and 51 are taken from the secondary windings 41 and 44, respectively, the lower terminal of each secondary being grounded. (If the voltage required is high enough, the taps 50 and 51 may coincide with the upper terminals of the respective secondaries.) A diode (52 or 53) is connected in circuit with the lower half of a secondary winding, the two diode circuits thus being in parallel.

In Fig. 5, the reactive pulses are induced directly from the sweep coils 60 and 61 in coils 62 and 63 inductively coupled to the sweep coils. If desired, one coil (62 or 63) can replace the two if the single coil is properly oriented in the sweep yoke 31. In this figure a series arrangement (like that of Fig. 2) has been shown. The diode of Fig. 2 has been replaced by a suitable crystal element 64 which, by way of example, can be germanium. Obviously, crystals can be used in the other arrangements as well.

Obviously, if the video signal is applied to the cathode of the cathode-ray tube 30 (instead of to the control grid), the blanking signals can be applied to the control grid 33. The tertiaries 42 and 45 are then poled so as to give negative pulses during flyback and the diode 46 (or 48) is reversed so that the cathode is connected to the tertiaries and the plate is connected to the control grid and bias resistor.

Various other changes can be made in the embodiments described above without departing from the spirit of invention.

What is claimed is:

1. Circuit means for blanking on its flyback strokes the beam produced in a cathode-ray tube by means including a beam control element, comprising means including a coil for producing sweep waves to deflect said beam, means including a crystal limiter for obtaining a reactive pulse from said coil during each flyback stroke of said sweep waves, and means for applying said pulse to said control element in the proper sense to cut off the beam.

2. Circuit means for blanking on its flyback strokes the beam produced in a cathode-ray tube by means including a beam control element, comprising means including a pair of coils for producing horizontal and vertical sweep waves to deflect said beams, a single coil inductively coupled to said pair of coils for obtaining a reactive pulse during each flyback stroke of said horizontal and vertical sweep waves, and means for applying said pulse to said control element in the proper sense to cut off the beam.

3. Circuit means for blanking on its flyback strokes the beam produced in a cathode-ray tube by means including a beam control element, comprising means including a first pair of coils for producing horizontal and vertical sweep waves to deflect said beam, means including a second pair of coils, the respective ones of the second pair being inductively coupled to the corresponding ones of the first pair of coils, and an asymmetrically conducting device connected in circuit therewith for obtaining a reactive pulse during each flyback stroke of said horizontal and vertical sweep waves, and means for applying said pulse to said control element in the proper sense to cut off the beam.

4. Circuit means for blanking on its flyback strokes the beam produced in a cathode-ray tube by means including a beam control element, comprising means including a first pair of coils for producing horizontal and vertical sweep waves to deflect said beam, means including a second pair of coils, the respective ones of the second pair being inductively coupled to the corresponding ones of the first pair of coils, and an asymmetrically conducting device connected in a series circuit therewith for obtaining a reactive pulse during each flyback stroke of said horizontal and vertical sweep waves, and means for applying said pulse to said control element in the proper sense to cut off the beam.

5. In combination, a television receiver picture tube having a beam control element therein, a vertical sweep circuit for controlling the vertical deflection of the beam in said tube, a horizontal sweep circuit for controlling the horizontal deflection of said beam, each of said sweep circuits producing a wave having sweep and flyback portions and having an output transformer, a separate winding for each of said transformers, and means for utilizing said separate transformer windings to blank the beam in said tube during each flyback portion of each sweep circuit output wave, said separate windings being connected in a circuit including a single diode made conducting by the pulse produced in either transformer during each flyback portion.

BERNARD M. OLIVER.

REFERENCES CITED

The following references are of record in the file of this patent:

UNITED STATES PATENTS

| Number | Name | Date |
|---|---|---|
| 2,153,655 | Urtel et al. | Apr. 11, 1939 |
| 2,235,053 | Urtel | Mar. 18, 1941 |
| 2,303,924 | Faudell | Dec. 1, 1942 |